United States Patent [19]

Hölter et al.

[11] 4,061,479

[45] Dec. 6, 1977

[54] APPARATUS FOR AND METHOD OF SEPARATING DROPLETS OF A LIQUID FROM A GAS

[75] Inventors: Heinz Hölter; Heinrich Igelbuscher, both of Gladbeck, Germany

[73] Assignee: Heinz Hölter, Gladbeck, Germany

[21] Appl. No.: 745,304

[22] Filed: Nov. 26, 1976

[30] Foreign Application Priority Data

Nov. 29, 1975 Germany .............................. 2553856
May 29, 1976 Germany .............................. 2624187

[51] Int. Cl.² ............................................ B01D 47/00
[52] U.S. Cl. .................................... 55/257 C; 55/259; 55/337; 55/416; 55/461; 55/452; 55/459 R; 55/466; 261/116
[58] Field of Search ...................... 55/257 C, 259, 337, 55/416, 452, 459 R, 461, 466; 261/116

[56] References Cited

U.S. PATENT DOCUMENTS 1,079,153 11/1913 Topf ........................................ 55/456
3,274,757 9/1966 Wapler .................................... 55/452
3,713,277 1/1973 Sackett, Sr. ............................. 55/259
3,759,016 9/1973 Smith ...................................... 55/452
3,880,623 4/1975 Aoyama .................................. 55/230

FOREIGN PATENT DOCUMENTS 2,153,398 5/1973 Germany ........................... 55/459 R
156,257 7/1921 United Kingdom ................... 55/461

Primary Examiner—Bernard Nozick
Attorney, Agent, or Firm—Berman, Aisenberg & Platt

[57] ABSTRACT

This invention relates to the separation of droplets of a liquid (such as a washing liquid) from a gas, in which a stream of gas is conducted along a broad-fronted arcuate path, defined by interior and exterior walls, liquid droplets impinging upon the exterior wall and being directed through slits provided in said exterior wall. Flow of gas into, through and from the part-annular chamber defined by said walls is substantially in directions lying in planes, extending at right-angles to the longitudinal axis of the chamber with little or no movement in the longitudinal direction.

7 Claims, 2 Drawing Figures

APPARATUS FOR AND METHOD OF SEPARATING DROPLETS OF A LIQUID FROM A GAS

BACKGROUND OF THE INVENTION

This invention concerns apparatus for separating droplets of a liquid, for example a washing liquid, from a gas, and in particular the kind in which a stream of gas is conducted along a curvilinear path.

Apparatus of this kind is widely known, and includes cyclonic separators (also known as Drop or Trickle separators) which have contact edges upon which the stream of gas is impinged, and lamellar separators, or a combination of these two systems. Separators of this kind may be collectively grouped under the heading of Radial Drop or Trickle separators.

In such radial separators, radial movement of the gas stream is invariably accompanied by movement in a longitudinal direction. In cyclonic separators and similar apparatus, the gas is conducted along a generally spiral path, which necessarily results in the formation of "Schlieren" or stratification of the gas stream into layers, which results in a considerably less efficient separation effect. Additionally, the droplets or mist particles entrained generally along the gas streams axis tend not to be separated out, and remain entrained within the gas stream as it leaves the apparatus.

It is one of the various objects of this invention to provide apparatus, by the use of which at least some of the disadvantages set out above may be overcome.

It is another of the various objects of this invention to provide a method of separating liquid droplets from the stream of gas, in which a high degree of separation may be achieved without undue difficulty.

SUMMARY OF THE INVENTION

This invention provides apparatus for separating liquid droplets from a gas and comprising interior and exterior curved walls defining an elongate chamber of generally uniform, part-annular cross section, inlet and outlet passages opening into the chamber, each of which being elongated in a direction longitudinally of the chamber and through which gas may flow into, around and from the chamber in a stream having little or no movement in a longitudinal direction, the exterior wall being provided with slits extending length-wise of the chamber through which liquid carried by the gas may pass therefrom as the gas flows around said annular chamber.

Thus, by the use of the apparatus, the stream of gas is positively guided in the form of a thin layer along a curvilinear path through the part-annular channel with little or no movement in the longitudinal direction. This prevents the formation of "Schlieren", or stratification of the gas stream into layers, and all the droplets of liquid carried by the stream of gas are subjected to similar forces in their passage through the chamber, so that substantially all said droplets can be trapped on the exterior wall and evacuated through the longitudinal slits. In this manner, the separation capacity of the apparatus is extremely good.

Preferably, gases admitted to the chamber flow along paths which lie generally in planes extending at right angles to the longitudinal axis of the chamber: conveniently, the inlet passage permits gas to approach the chamber in a generally radial direction, and is arranged in such a way that the gas stream is re-directed into a substantially tangential direction with regard to the chamber, whereby the gas flow is introduced into the chamber in a substantially smooth and shock-free flow. Gas flowing through the outlet passage may be re-directed into the desired direction in the same way.

The outlet passage may be succeeded by a de-mister device designed to separate residual mist droplets from the gas stream.

Separation efficiency of the apparatus may be further improved by the provision of baffle elements connected to the exterior and/or interior walls of the chamber, conveniently being adjustably hinged to one or both said walls and extending longitudinally of the chamber. By the use of such adjustable elements, it is possible to reduce the cross section of the chamber and thus obtain higher contact energy, which improves the degree of separation. The adjustable elements may also be used to deflect the gas stream in the direction of the longitudinal slits in order to improve droplet separation within said slits.

In the washing or scrubbing of, for example, heavily sulphur-polluted waste gases, it is necessary to work with very high water contents. In this event it is preferable to separate a major proportion of the water contained in the gas stream before this is admitted to the chamber. This can successfully be achieved by connecting a lamellar water stripper across, preferably at right angles to, the direction of flow of the gas stream towards and into the part-annular chamber. Preferably the water stripper comprises a grating and a drainage conduit, preferably in the form of a pouch, fitted beneath said grating to catch the water which has been separated thereby from the gas stream. Thus, gas, together with the washing liquid carried thereby, will first impinge on the grating, pass therethrough collect in the region of the drainage conduit and be deflected with the consequence that most of the washing liquid will separate. The re-directed gas stream passes again through the stripper grating, whereby a further quantity of water will be extracted, and is then directed into the part-annular chamber. In this way, as much as 90% of the water content may be extracted from the gas stream before it is actually fed into the annular chamber.

Conveniently, to reduce energy loss suffered by the gas stream in its passage through the water stripper, the grating may be designed, at least in part, as a deflector to change the direction of the stream of gas from a generally radial inward direction into a generally tangential direction into the part-annular channel.

This invention also provides a method of separating liquid droplets from a stream of gas in which the gas is conducted through an inlet into and along a broad-fronted arcuate path defined by interior and exterior wall members, in the exterior wall member of which there is provided, extending generally in an axial direction, a plurality of slits, the liquid droplets in the stream of gas during flow thereof around said arcuate path being urged against the exterior wall and passing through the slits as the gas flows around the arcuate path towards an outlet.

DETAILED DESCRIPTION OF THE PREFERRED EMBODIMENTS

Figure 1:
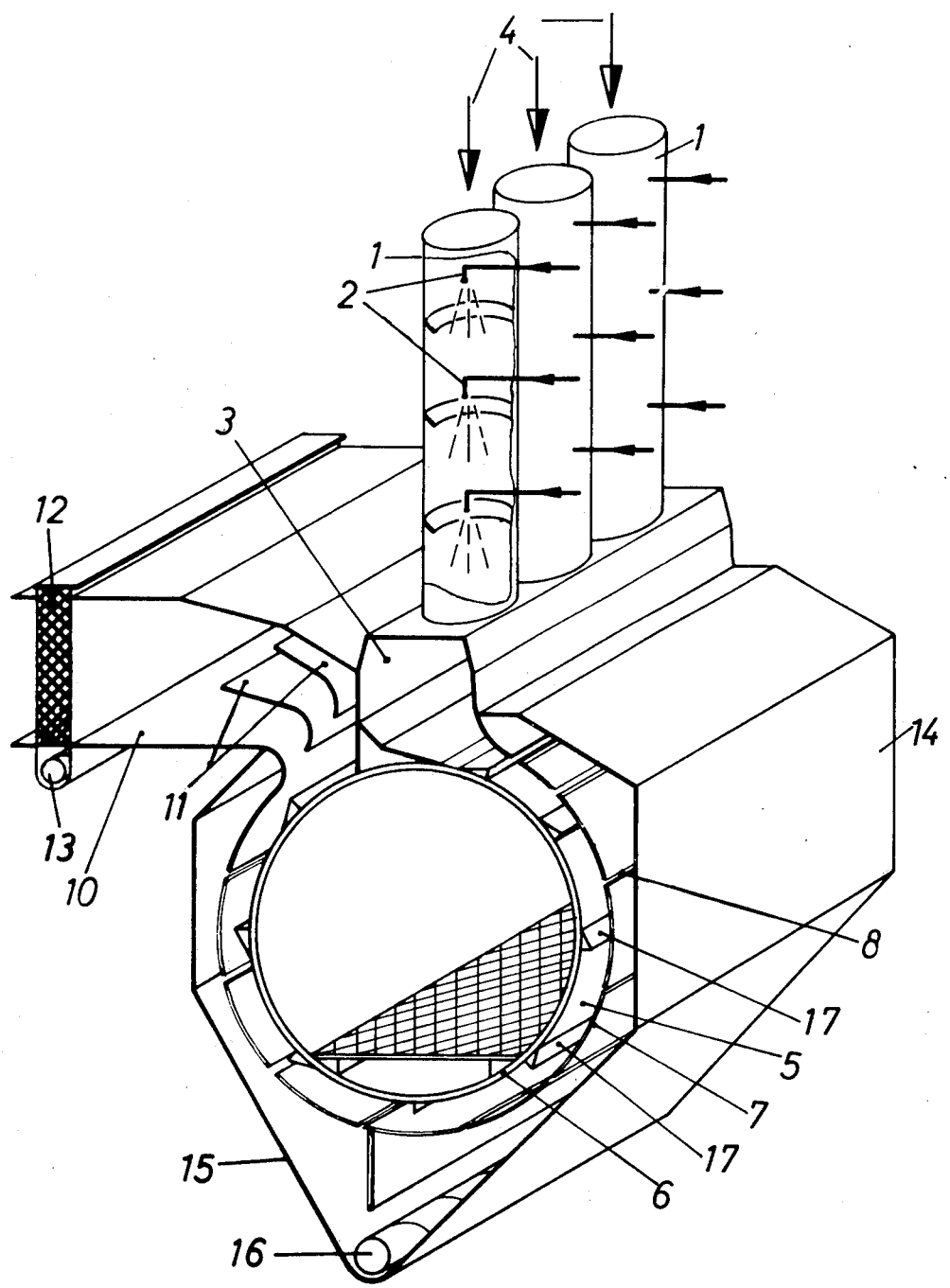
FIG. 1 is a perspective view, part shown in section, of apparatus which is a first embodiment of this invention and which has been selected to illustrate the invention by way of example.

The apparatus illustrated in FIG. 1 of the drawings is designed to separate droplets of a washing liquid from a stream of gas, the washing liquid being introduced into the gas stream in the pipes 1 preceding the apparatus of this invention through sprayjets 2, which pipes 1 may be scrubbing or venturi or agglomeration pipes. Leaving the pipes 1, the gas stream enters into an elongated inlet passage or manifold 3 of enlarged, diffuser-like cross section wherein it is subjected to a change of direction from a radial direction 4 to a tangential direction so that it may smoothly enter into a substantially cylindrical part-annular chamber 5 extending parallel to and beneath the inlet passage 3 and flow essentially solely in a circumferential direction through said chamber 5.

The part-annular chamber 5 is defined by an interior wall 6 provided by a cylindrical pipe and an exterior wall 7 which is arranged concentrically with the interior wall 6 and which is provided with a plurality of circumferentially spaced scaling or skimmer slits 8 extending lengthwise of the chamber 5, viz, in the axial direction.

After the gas stream has been guided in the circumferential direction through the chamber 5 it arrives at an outlet passage or manifold 10 which is situated adjacent to the inlet passage 3 and which is also enlarged to function as a diffuser, having baffle plates 11 arranged in said outlet passage 10 to direct the gas stream into the desired direction.

A demister device 12, which may be a filter, is connected to the outlet passage 10, and below said demister device 12 there is a channel 13 to catch and evacuate the water collected in the demister device 12.

The apparatus illustrated in FIG. 1 is encased in a housing 14 whereof the lower portion 15 is of funnel configuration to collect the water separated by the apparatus and which comprises a suitable pipeline 16 for evacuating the collected water, and operates in the following way:

The gas stream, laden with washing liquid, is conducted through the inlet passage 3 and circumferentially through the part-annular chamber 5. The water droplets which are conveyed by the gas stream are pushed by the centrifugal forces in the direction towards the exterior wall 7 and escape through the slits 8, possibly with part of the gas stream. The water collects in the lower portion 15 of the housing 14 and is evacuated through the pipeline 16. Residual mist droplets which have not been separated out in this way will be trapped in the demister device 12.

In the apparatus illustrated in FIG. 1 the interior wall 6 is provided on the side which faces the chamber 5 with a plurality of circumferentially spaced axially extending baffle elements provided by adjustable plates 17 hingedly mounted on the wall, whereby the cross section of the annular chamber may be reduced in the circumferential direction to improve contact energy and to direct the gas stream towards the scaling or skimmer slits 8 with the result of improved droplet separation within the said slits 8.

The apparatus, which may be considered to be a cylinder-type design of a radial trickle separator, conducts the gas stream in a comparatively thin layer substantially exclusively in the circumferential direction of the chamber 5 and substantially no flow in the axial direction takes place. Consequently, the risk of stratification or "Schlieren" formation is eliminated.

Figure 2:
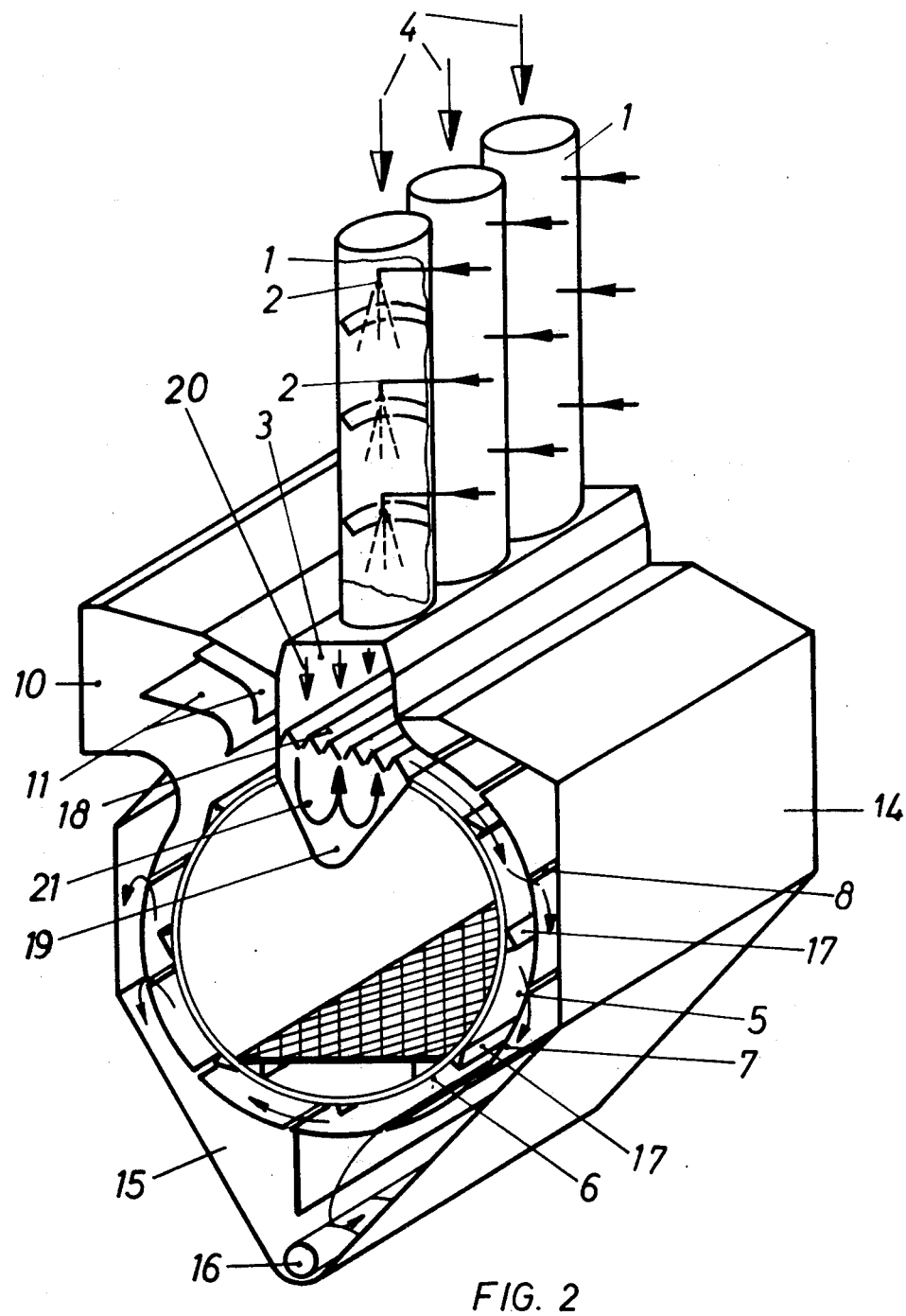
FIG. 2 is a similar view of apparatus which is a second embodiment of this invention.

In the apparatus illustrated in FIG. 2, like references have been used for like parts. Basically the apparatus according to FIG. 2 is designed in the same way as the apparatus according to FIG. 1. However, the apparatus shown in FIG. 2 additionally comprises a lamellar water stripper comprising a grating arranged in the inlet passage 3 orthogonally in relation with the direction of flow of the admitted gas stream, said grating 18 in the illustrated example consisting of a plurality of relatively parallel members of angular cross section. Beneath the grating 18 there is provided a drainage conduit 19 in the form of a pouch or bag for evacuation of the water which has been stripped from the gas stream. It will be noted from FIG. 2 that the stripper grating 18 is at least partly designed to change the gas flow from a radial direction into a direction which is tangential relative to the chamber 5 by virtue of the fact that one of the angles of the grating 18 is arranged in the immediate vicinity of the point at which the gas stream enters into the chamber 5.

The apparatus illustrated in FIG. 2 works in the following way:

The gas which has been enriched with large quantities of washing liquid, flows initially in the radial direction (arrow 20) into the inlet passage 3 and there impinges against the water stripper grating 18 which is arranged orthogonally relative to the direction of gas flow, and passes through this grating, where some of the water is retained in the region of the drainage conduit 19, and the gas redirected in the direction of the arrows 21. This reversal of flow causes the major part of the washing liquid to fall out of the gas stream. A further portion of the washing liquid still carried along by the gas stream is separated out in the course of the second passage through lamellar grating 18 after said reversal of flow. In the final result up to 90% of washing liquid is extracted from the gas stream before the latter enters into the chamber 5 wherein it is cleaned of the remaining water droplets under drop in pressure.

We claim:

1. Apparatus for separating liquid droplets from a gas, comprising an elongate cylindrical chamber having a generally horizontal axis and including a continuous interior wall and a closely spaced coaxial continuous exterior wall, the exterior wall having annularly spaced longitudinal slits substantially parallel to the chamber axis through which liquid carried by the gas may pass out as the gas flows around the chamber, elongated inlet and outlet manifolds annularly spaced apart along the circumference of said chamber, each said manifold having an opening into said chamber of approximately the cross sectional area of the chamber and smaller than the cross section of the manifold and extending along substantially the entire length of and parallel to the chamber axis, a plurality of inlet ducts, for gas under pressure, having axes radial to said chamber and connected to said inlet manifold one after another substantially its full length, each of said ducts housing spray jet means for mixing wash water with incoming gas, and baffle means in said inlet manifold for changing the direction of flow of the incoming gas from a direction radial of the chamber to a direction tangential to the chamber as the incoming gas enters the chamber through said opening in the inlet manifold, whereby incoming gas under pressure mixed with wash water will flow through the inlet ducts into the inlet manifold, strike the baffle means and change from radial direction to enter the chamber tangentially through the inlet manifold opening, flow circumferentially around the chamber in a stream of greater velocity having no stratification and little or no movement longitudinally of the chamber, while liquid droplets are efficiently separated from the stream through said slits, and finally emerge from the chamber through the outlet manifold.

2. Apparatus according to claim 1, comprising a demister device connected to the outlet manifold and through which gas flows outward of the outlet manifold.

3. Apparatus according to claim 1 comprising baffle elements connected to one of said interior and exterior walls and which extend into the annular chamber between them.

4. Apparatus according to claim 1, wherein said outlet manifold is provided with means for causing gas leaving the chamber to flow in a generally radial direction.

5. Apparatus according to claim 4, wherein the outlet manifold is enlarged immediately downstream of its opening from the chamber to provide for diffusion of the gas as it leaves said chamber.

6. Apparatus according to claim 1, wherein said baffle means in the inlet manifold comprises a lamellar water stripper extending substantially at right angles to the direction of gas flow, ducting means being provided below the water stripper for draining water removed by the water stripper.

7. Apparatus according to claim 1 wherein the water stripper is a grating of parallel members of angular cross section, one angular side of each member constituting means to change gas flow from a radial direction to a direction substantially tangential to the interior wall of the chamber.

* * * * *

UNITED STATES PATENT AND TRADEMARK OFFICE
CERTIFICATE OF CORRECTION

PATENT NO. : 4,061,479
DATED : December 6, 1977
INVENTOR(S) : HÖLTER ET AL

It is certified that error appears in the above-identified patent and that said Letters Patent are hereby corrected as shown below:

Column 1, line 65, "chamber:" should read --chamber;--. Column 2, line 35, "therethrough" should read --therethrough,--. Column 3, line 27, "chamber 5" should read --chamber 5,--; line 56, "circumferentially spaced" should read --circumferentially-spaced--. Column 4, line 59, "another" should read --another along--. Column 6, line 13, "claim 1" should read --claim 6--.

Signed and Sealed this

Seventeenth Day of October 1978

[SEAL]

Attest:

RUTH C. MASON
Attesting Officer

DONALD W. BANNER
Commissioner of Patents and Trademarks